United States Patent [19]
Serritella

[11] 3,946,360
[45] Mar. 23, 1976

[54] VEHICLE WARNING SYSTEM
[76] Inventor: Daniel J. Serritella, 7757 S. Narragansett, Burbank, Ill. 60459
[22] Filed: Dec. 19, 1974
[21] Appl. No.: 534,458

[52] U.S. Cl. .............................. 340/61; 200/61.44
[51] Int. Cl.² ...................... B60Q 1/00; H01H 3/16
[58] Field of Search .................... 340/52 H, 61, 51; 200/61.44

[56] References Cited
UNITED STATES PATENTS

| | | | |
|---|---|---|---|
| 2,683,196 | 7/1954 | Hunter | 340/61 |
| 2,762,995 | 9/1956 | Gilbert | 340/61 |
| 2,786,910 | 3/1957 | Tyska | 340/61 X |
| 3,308,903 | 3/1967 | Sobel et al. | 200/61.44 X |
| 3,478,311 | 11/1969 | Czingula | 340/51 |

Primary Examiner—Donald J. Yusko
Attorney, Agent, or Firm—Marden S. Gordon

[57] ABSTRACT

A warning system for a vehicle to warn the vehicle driver upon contact of the vehicle's front or back bumper with an obstacle, such as another vehicle bumper when parking, including pressure sensitive electrical contacts in bumper guards affixed to the front and back vehicle bumpers and connected by suitable insulated electrical wiring to the vehicle battery and to a light and buzzer mounted in the vehicle passenger compartment for both visibly and audibly signalling to the vehicle driver upon contact of the bumpers with any obstacle.

3 Claims, 7 Drawing Figures

U.S. Patent  March 23, 1976  3,946,360
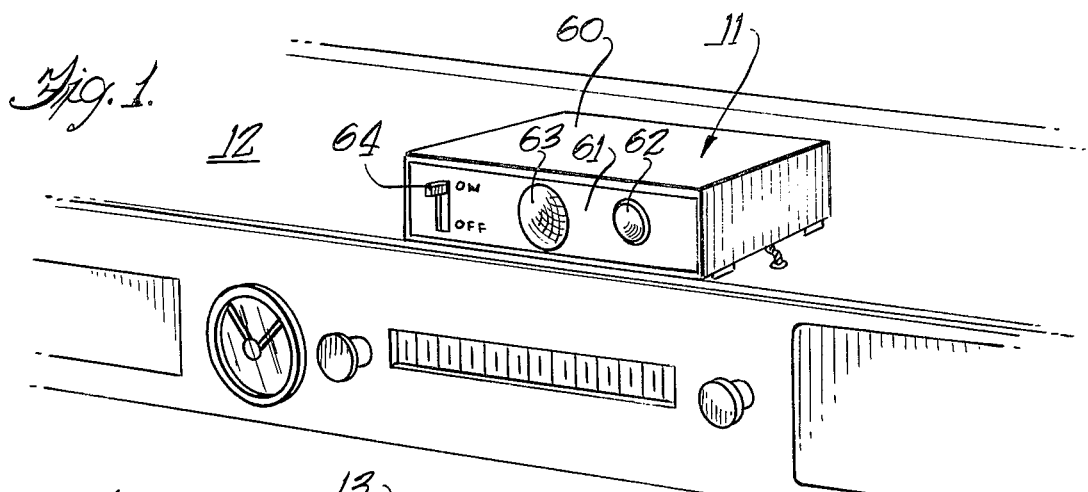
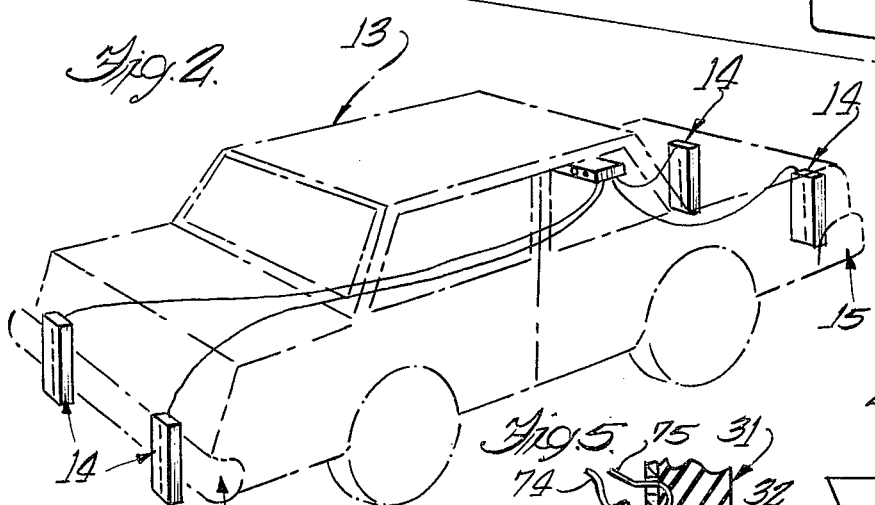
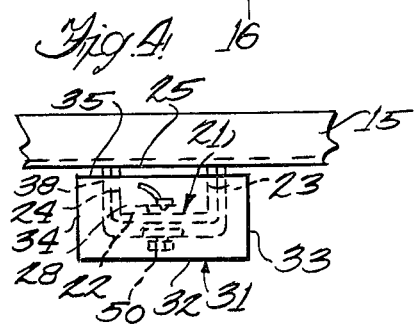
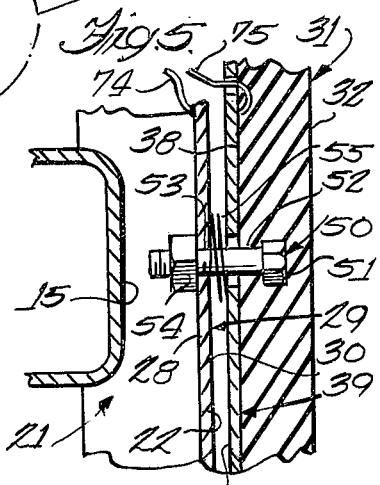
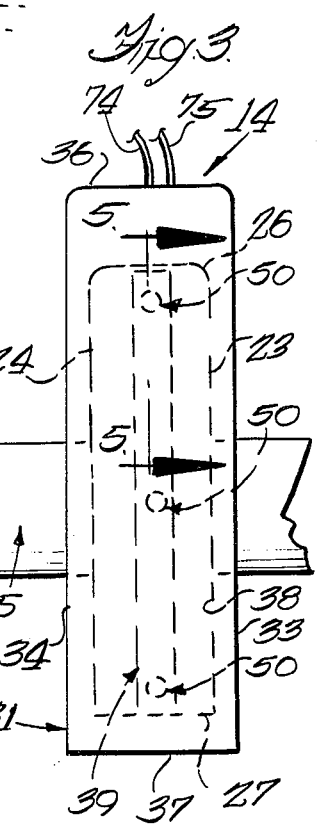
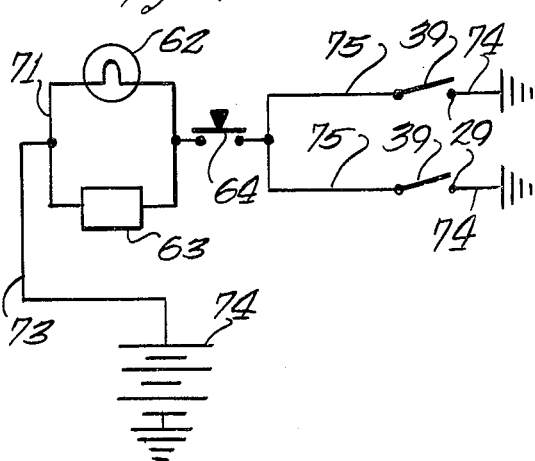
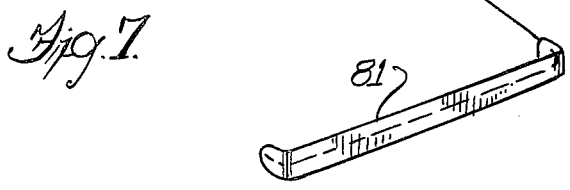

3,946,360

VEHICLE WARNING SYSTEM

BACKGROUND OF THE INVENTION

1. Field of the Invention

This invention relates generally to vehicle accessories and more particularly to a novel and improved vehicle warning system to both audibly and visibly signal the vehicle driver as to initial engagement of portions of the vehicle front or back bumper when an obstacle, such as a loading platform, so that the driver may stop the vehicle and prevent damage to the vehicle as well as preventing damage to the obstacle.

2. Description of the Prior Art

In view of the constantly increasing number of vehicles on the roadways, it is essential that such vehicles be equipped with as many safety devices as possible to prevent damage to the vehicle, especially in view of the high cost of vehicle repairs in the present market situation.

One area where vehicles appear to suffer continuing damage is in the area of the front and back vehicle bumper when such encounter obstructions, such damage being both to the vehicle as well as to the obstruction so encountered. Examples of this damage occur when the vehicle bumper encounters a wheeled grocery cart in the parking lot of a supermarket, such cart being of a low design to be generally invisible from the driver's position when the cart is immediately in front of the vehicle and with the driver only learning of the cart's positioning after hearing the grinding noise of metal-to-metal contact between the vehicle and the cart, such noise normally coming too late to avoid damage to the vehicle bumper and vehicle grille as well as to the shopping cart.

A further area of damage occurs when vehicles back into a loading platform to receive goods, the vehicle back bumper frequently encountering the loading platform and causing damage both to the bumper and to the loading platform.

Yet still a further area in which damage is incurred with vehicles is in the parking of the vehicle in the garage at home where, due to the constantly increasing length of vehicles, the vehicle just fits within the garage with it frequently being necessary to pull the front or back bumper as far into the garage as possible so as to be within fractions of an inch from the front interior wall of the garage, and with vehicle drivers frequently encountering the front garage wall when parking the vehicle to thus cause damage both to the vehicle and to the garage wall.

SUMMARY OF THE INVENTION

The present invention provides a novel vehicle warning system to provide both a visual and audible signal to a vehicle driver upon the front or back vehicle bumpers encountering any obstruction, such as a garage wall, loading platform, shopping cart, and the like to permit the driver to apply the vehicle brake and prevent further movement of the vehicle and thus eliminate the possibility of damage to both the vehicle and to the obstruction being encountered thereby.

It is a feature of the present invention to provide a vehicle warning system.

A further feature of the present invention provides a vehicle warning system which is relatively simple in its construction and which therefore may be readily manufactured at a relatively low cost and by simply manufacturing methods so that it can be retailed at a sufficiently low price to encourage widespread use thereof among the general public.

Still a further feature of the present invention provides a vehicle warning system which is possessed of few parts and which therefore is unlikely to get out of order.

Still a further feature of the present invention provides a vehicle warning system which is easy to use and reliable and efficient in operation; and one which is aesthetically pleasing and refined in appearance so as to blend in with the design of the vehicle on which it is installed.

Still yet a further feature of the present invention provides a vehicle warning system which may, in its entirety, be manufactured and installed as part of the original equipment of the vehicle, or which may be readily attached to the vehicle later as an accessory item without requiring any special tools, skills or expertise on the part of the vehicle owner who may readily install the accessory on his own vehicle.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the vehicle dashboard having a portion of the warning system of the present invention mounted thereon;

FIG. 2 is a diagrammatic perspective view of a vehicle having the vehicle warning system of the present invention illustrated thereon;

FIG. 3 is a front elevational view of the bumper guard;

FIG. 4 is a top plan view of the bumper guard of FIG. 3;

FIG. 5 is an enlarged fragmentary cross-sectional view taken along line 5—5 of FIG. 3;

FIG. 6 is an electrical schematic diagram of the vehicle warning system of the invention; and FIG. 7 is a diagrammatic perspective view of a modified form of the invention.

DESCRIPTION OF THE PREFERRED EMBODIMENTS

Referring now to the drawings in detail and in particular to FIGS. 1 to 6 inclusive, there is illustrated a first preferred form of a vehicle warning system constructed in accordance with the principles of the present invention and which is comprised generally of a control panel 11 adapted to be mounted on dashboard 12 of a conventional vehicle 13 in a position thereon readily visible to the vehicle driver, and bumper guards 14 manufactured of resilient flexible material, such as rubber, and affixed to the front and back bumpers 15 and 16 respectively of the vehicle and projecting forwardly from the respective bumpers to initially engage any obstruction in the path of travel of the vehicle.

Each of the bumpers 14 consist of an inner vertically disposed rectangular box-like shaped member 21 having a flat vertical front wall 22, opposed flat vertical end walls 23 and 24, vertically extending back wall 25, and opposed horizontal flat top and bottom walls 26 and 27. Inner member 21 is affixed to bumper 15 and 16 in any suitable manner with back surface 25 in engagement with the bumper and with the inner member 21 extending vertically normal to the axis of the bumper.

The inner member 21 is manufactured of resilient electrical insulating material, such as rubber, and is provided in front face 22 thereof with a vertically extending slot 28. An elongated flat rectangularly configured metallic electrical conducting strip 29 is affixed in slot 28 and has a front surface 30 projecting slightly outwardly of inner member front surface 22.

Each bumper guard 14 includes supported about its associated inner member 21 an outer member 31 which is of a rectangular box-like configuration having flat vertical front wall surface 32, opposed flat vertical side wall surfaces 33 and 34, a flat vertical back wall surface 35, and flat horizontal top and bottom surfaces 36 and 37. A rectangular box-shaped recess 38 is formed therein opening out back surface 35 and is of a depth, height and width to freely receive therein inner member 21.

Disposed along the interior of front wall 32 and recess 38 is a flat metallic electrical conducting strip 39 having a front surface 40, the strip 39 being disposed in vertical disposition aligned with the strip 29 and spaced slightly horizontally outwardly therefrom such that face surface 40 is disposed in confronting spaced apart relationship to face surface 30.

Securing outer member 31 to inner member 21 is a bolt 50 having an enlarged head portion 51 imbedded in outer member 31 and having a threaded shank 52 extending outwardly of the outer member into outer member compartment 38 to be slidably received in aperture 53 of inner member 21 where it is secured in place by being threadedly received in a nut 54 secured in the inner member. The shank 52 is manufactured of electrical insulating material. In addition, to maintain strips 29 and 39 spaced apart, a coiled spring 55 manufactured of electrical insulating resilient material is disposed concentric with shank 52 and intermediate the face surfaces 30 and 40 of strips 29 and 39 respectively to resiliently maintain the outer member 31 spaced from inner member 21. The control panel 11 includes a hollow box-shaped housing 60 having a front surface 61 in which there is mounted an electric lamp 62 and an electrically operated buzzer 63 along with a manually operated electrical on-off switch 64. While control panel 11 is illustrated as being mounted on the top of dashboard 12, it is to be understood that the same may be mounted at other positions in the passenger compartment with it being preferred that the same be mounted in a position readily visible to the vehicle driver for indication of the lamp 62 as a signal to the vehicle driver in a manner as will be later described.

As seen in FIG. 6, the lamp 62 and buzzer 63 are connected in electrical parallel relationship by wires 71 and 72, with wire 71 being connected by suitably insulated electrical wiring 73 to one terminal of the vehicle battery 74, the other terminal of the vehicle battery being grounded to the vehicle frame in the conventional manner. The stationary strips 29 are connected by electrical wire 74 to the vehicle frame, with the movable strips 39 being connected by suitable insulated electrical wires 75 to one terminal of switch 64, the opposite terminal of switch 64 being connected to wire 72. Along these lines it is envisioned that wire 74 would be connected to the associated bumper on which the bumper guard 14 is mounted which, for example, in FIG. 5 would be bumper 15.

In operation, a vehicle driver turns on switch 64 to energize the warning system of the invention, and then upon the vehicle bumper guards 14 encountering any obstructions, such as the wall of a garage, the outer member 31 is compressed inwardly in the direction of inner member 21 to engage strip 39 with strip 29 this completing the electrical circuit to energize lamp 69 and buzzer 63 to provide both an audible and visible signal to the vehicle driver as to the encountering of the obstacle.

Referring to FIG. 7 there is illustrated a modified embodiment of the invention wherein rather than the bumper guards 14 being disposed vertically there is provided a pair of horizontal bumper guard strips 80 and 81 which are constructed in the same manner as bumper guards 14 but which are applied vertically completely across the exteriormost surfaces of the front and back bumpers of the vehicle to offer a broader area of protection to the vehicle bumpers. It is understood that the bumper guard strips 80 and 81 operate in the same manner as bumper guards 14 previously described.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A vehicle warning system intended to be mounted to the front and back bumpers of a vehicle to warn the vehicle driver of the bumpers encountering an obstacle, the system comprising, in combination:

at least one pair of bumper guard members each of an identical structure and adapted to be mounted on the front and back bumpers respectively of the vehicle and project outwardly thereof forwardly of the bumper on which it is mounted;

pressure sensitive electrical contact means mounted in each of said bumper guards and being of a normally open electrical configuration adapted to be closed upon the engagement of said bumper guard with an obstacle;

a source of electrical energy;

an electric lamp;

an electrically operated buzzer;

electrical wiring means connecting said lamp in parallel relationship with said buzzer for simultaneous operation thereof;

an electrical switch manually operable between an on and an off position for selectively energizing and de-energizing said warning system, said switch being electrically wired intermediate said source of electrical energy and said parallelly connected lamp and buzzer; and suitably insulated electrical wires interconnecting said switch, lamp and buzzer to said electrical contact means of said bumper guards;

a control panel of a hollow rectangular box-like configuration adapted to be mounted on a dashboard of the vehicle in a position readily accessible to and viewable by the vehicle driver, said control panel having said lamp, buzzer and electrical switch mounted therein;

each bumper guard comprising;

an inner member of a general box-like rectangular configuration having a flat vertical front wall surface, opposed flat vertical side wall surfaces, a back wall surface, and flat horizontal top and bottom wall surfaces;

means adapted to mount said inner member in vertical disposition relative to a horizontal vehicle bumper on said bumper with said inner member back surface engaging said bumper and with said inner member extending both forwardly and upwardly and downwardly from said bumper;

a slot extending vertically through said front surface of said inner member;

a metallic electrical conducting strip of an elongated rectangular configuration affixed in said slot and having a flat face surface projecting slightly forwardly of said inner member front surface;

an outer member of a box-like rectangular configuration having a flat vertical front surface, a flat vertical back surface, opposed flat vertical side wall surfaces, and opposed horizontal flat top and bottom surfaces;

a box-shaped rectangular recess formed inwardly of said side wall surfaces opening out of said back wall surface, said recess being of a width, depth, and height to freely receive a major portion of said inner member therein;

a metallic electrical conducting rectangularly shaped strip affixed to an interior front wall of said recess and disposed in confronting alignment with said inner member strip and spaced horizontally forwardly therefrom and extending generally parallel thereto; and means resiliently retaining said outer member to said inner member with said strips in normally spaced apart relationship.

2. The vehicle warning system as set forth in claim 1 wherein each of said bumper guard members are disposed horizontally along the complete width of said vehicle bumper with said inner member being affixed to said vehicle bumper and extending horizontally therealong and with said outer member being resiliently affixed to said inner member and extending horizontally therealong.

3. The vehicle warning system as set forth in claim 2 wherein said inner member is manufactured of a rubber material and wherein said outer member is manufactured of a rubber material.

* * * * *